INVENTOR
HANS NOLL.
ATTORNEY.

July 17, 1962         H. NOLL         3,044,592
BLOCKING MECHANISM FOR CLAW CLUTCHES
Filed Aug. 10, 1959                   4 Sheets-Sheet 4
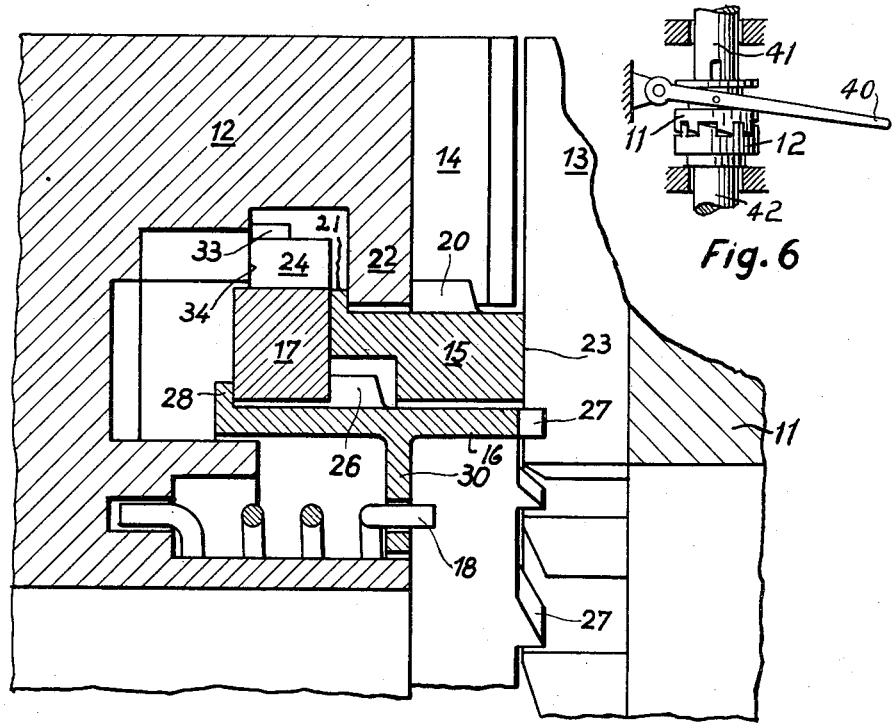
Fig. 6
Fig. 7
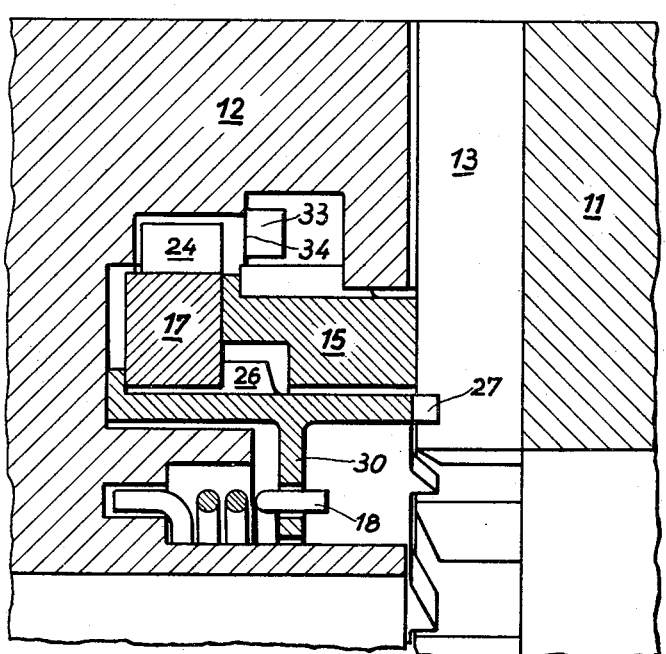
Fig. 8
INVENTOR.
HANS NOLL.
K.A. Mayr
ATTORNEY.

United States Patent Office

3,044,592
Patented July 17, 1962

3,044,592
BLOCKING MECHANISM FOR CLAW CLUTCHES
Hans Noll, Tettnang, Germany, assignor to Maybach-Motorenbau G.m.b.H., Friedrichshafen, Germany, a firm of Germany
Filed Aug. 10, 1959, Ser. No. 832,689
Claims priority, application Germany Aug. 13, 1958
10 Claims. (Cl. 192—67)

The present invention relates to a blocking device for a claw clutch, particularly for change speed and reversing gears or plain reversing gears for motorized rail vehicles of relatively great power, wherein the claws have faces which are inclined in the same circumferential direction.

The claws of the mating parts of so-called overrunning clutches repulse one another upon relative rotation of the mating parts in one direction and engage one another upon reversal of the relative rotation. When the claws of the two mating parts repulse one another the two mating parts are axially moved from one another and bounced against one another by the pressure tending to engage the clutch. This causes ratcheting or clicking which is particularly undesirable in clutches which transmit great torque and are correspondingly large because the vibrations of great masses unduly stress the claws and the clutch actuating elements.

A claw clutch is known which has a mating part provided with locking claws of limited rotatability, the locking claws extending the overrunning surfaces of the power transmitting claws whereby the axial movement of the repulsing claws is reduced.

It is the object of the present invention to entirely eliminate ratcheting and clicking of the claws by providing a blocking device which is so arranged in the mating clutch parts that it prevents insertion of the claws of one of the mating parts into the gaps between the claws of the other mating part when the two parts rotate in one direction of relative rotation. After reversal of this direction of relative rotation a detent means is actuated by one of the clutch parts for unblocking the blocking means.

In a preferred embodiment of the invention the blocking means includes an annular abutment surface in one of the mating clutch parts and a plurality of surfaces in the second clutch part and abutting the annular surface in the first clutch part. The blocking means are actuated, i.e. placed in blocking and unblocking position, by a detent which is operated by an annular means engaged by the second clutch part. A spring presses the annular means against the second clutch part and holds said means and thereby the detent in a position in which the blocking means are in the blocking position. The annular means is provided with saw teeth which extend axially beyond the annular abutment surface and which are overrun at one relative direction of rotation of the mating clutch parts whereby the annular means yields to the clutch engaging pressure aganist the action of the spring. After reversal of the direction of relative rotation of the clutch parts the annular means is rotated against the action of the spring until the detent is moved to the position in which the blocking means are unblocked.

The novel features which are considered characteristic of the invention are set forth with particularity in the appended claims. The invention itself, however, and additional objects and advantages thereof will best be understood from the following description of embodiments thereof when read in connection with the accompanying drawing in which:

FIG. 6 is a diagrammatic side elevation of a clutch according to the invention.

FIG. 7 is a longitudinal sectional view of a clutch portion in disengaged position.

FIG. 8 is a longitudinal sectional view of the clutch portion shown in FIG. 7 in engaged position.

Like parts are designated by like numerals in all figures of the drawing.

Figure 1:
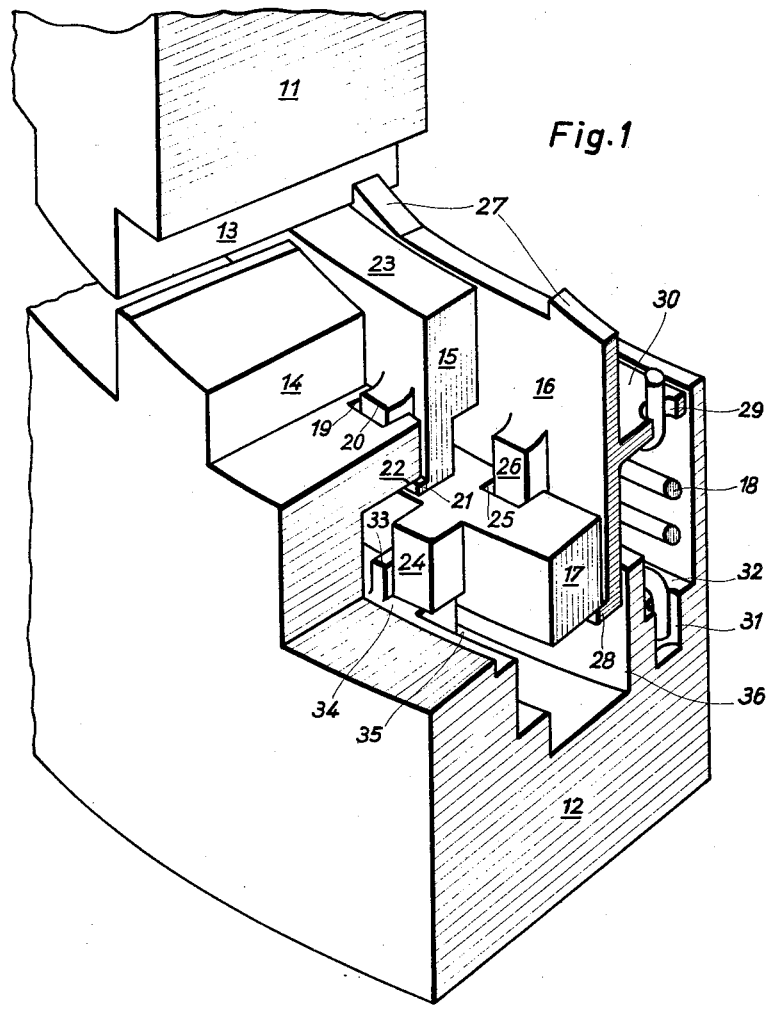
FIG. 1 is a perspective diagrammatic view of a portion cut away from a claw clutch according to the invention in disengaged position.
Figure 3:
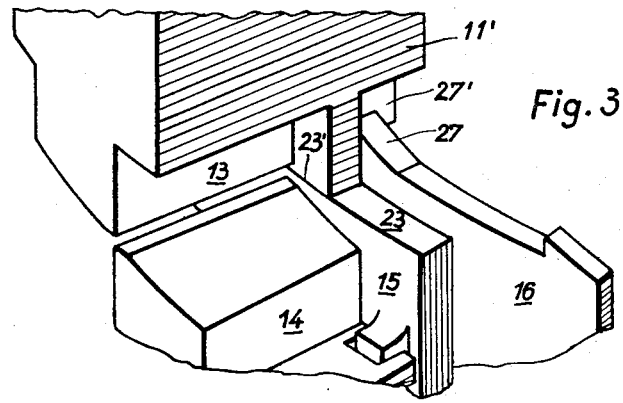
FIG. 3 is a perspective diagrammatic illustration of a portion cut away from a modified claw clutch according to the invention in disengaged position.
Figure 4:
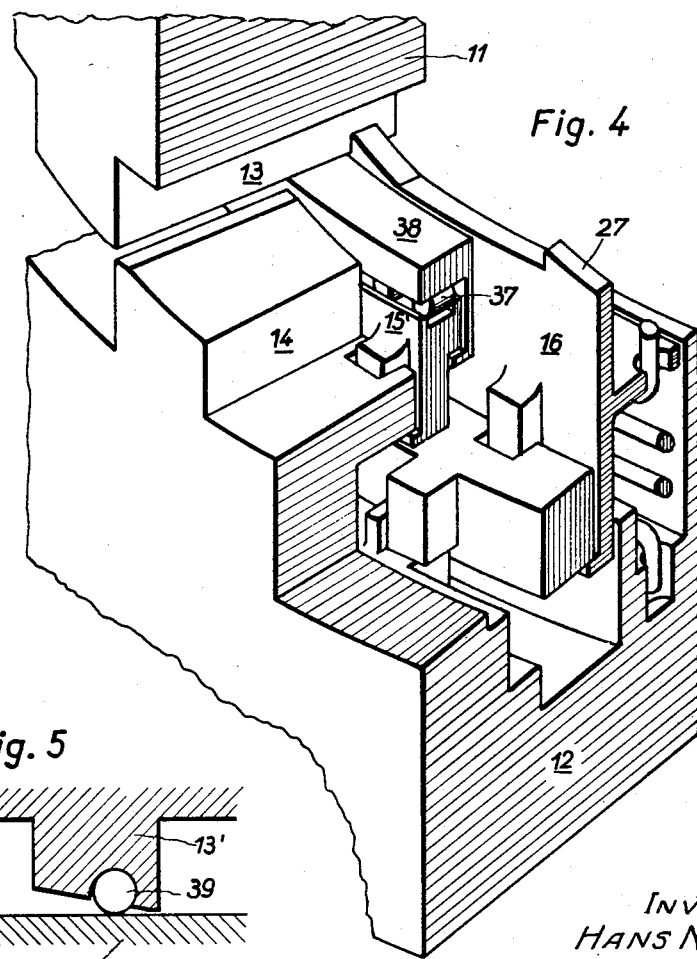
FIG. 4 is a perspective diagrammatic illustration of a portion cut away from a further modification of a claw clutch according to the invention in disengaged position.

Referring more particularly to the drawing, numerals 11 and 12 designate mating parts of a claw clutch, the parts 11 and 12 being provided with claws 13 and 14, respectively, only one claw of each clutch part being shown in FIGS. 1, 3 and 4. Each claw has an inclined face whereby the inclination of all claws is the same in the same circumferential direction. As seen in FIG. 6, the clutch part 11 is axially movable on a shaft 41 but not rotatable thereon. The clutch part 12 is rigidly mounted on a shaft 42. The clutch part 11 can be axially moved towards and from the part 12 by manipulation of a lever 40. The claws 13 extend radially toward the rotation axis of the clutch beyond the claws 14. The clutch part 12 includes, in coaxial arrangement, a blocking ring 15, a catch ring 16, a detent ring 17, and a helical spring 18. The blocking ring 15 is located between the claws 14 and the catch ring 16 and is connected by means of one or more protuberances 20, individually guided in one or more axial grooves 19, with the clutch member 12 to rotate therewith and to permit axial movement of the blocking ring 15. The latter has an annular projecting rim or flange 21 having a radial surface abutting against a corresponding radial surface 22 of the clutch member 12. The ring 15 has a radial gliding surface 23 facing the clutch part 11. One or more protuberances 24 extend radially from the outside surface of the detent ring 17. The inside of the ring 17 is provided with one or more axial grooves 25 guiding a radial protuberance 26 extending from the outside of the catch ring 16. The end surface of the ring 16 facing the clutch half 11 is provided with saw teeth 27 spaced to correspond to the spacing of the claws of the clutch. The other end of the ring 16 has an outwardly projecting flange 28 having a radial surface abutting against the detent ring 17. The inside of the catch ring 16 is provided with a protuberance 30 having a bore 29 in which one end of the spring 18 is received. The second end of the spring 18 is held in a bore 31 of a portion 32 of the clutch member 12. The latter is provided with one or more abutments 33 for abutting against an axial surface of the protuberance or protuberances 24. The clutch part 12 also has a radial abutment surface 34 for abutting against a radial surface of the protuberance 24 and has a recess or trap 35 for receiving the protuberance 24. An annular groove 36 is provided in the part 12 for receiving the catch ring 16 and the detent ring 17 held thereon by the flange 28.

When the clutch is disengaged, the blocking ring 15 is always in blocking position whereby its radial glide surface 23 projects slightly outside of the claws 14. This blocking position is effected by the spring 18 which presses the catch ring 16 and its flange 28 in axial direction against the detent ring 17 and the latter against the blocking ring 15 whose axial movement is limited by abutment of the flange 21 against the abutment 22 of the clutch member 12. The spring 18 also tends to rotate the ring 16 and, because of the elements 25, 26, the ring 17 to press the protuberance 24 against the abutment 33. In this position the protuberance 24 rests on the abutment surface 34 of the part 12.

Figure 2A:
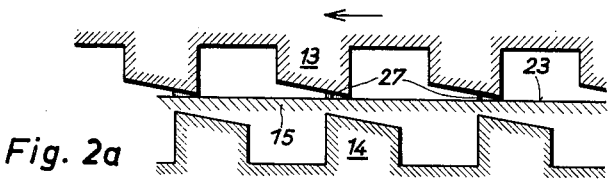
FIGS. 2a to 2f are diagrams showing parts of the claw clutch illustrated in FIG. 1, in different operating positions.

FIGS. 2a to 2f show parts of the clutch in various positions during engagement of the clutch. The direction of the relative rotation of the clutch halves 11 and 12 is indicated by an arrow whose length represents the relative angular velocity. When the clutch half 11 is moved toward the clutch half 12 the relative direction of rotation is so that the claws 14 would repulse the claws 13, the latter overrunning the former, if they would come in contact. This, however, is prevented by the blocking ring 15 on which portions of the claws 13 glide (FIG. 2a). The axial pressure of the ring 15 is counteracted by the detent ring 17 whose radial protuberance 24 abuts against the surface 34 of the clutch part 12. The inclined faces of the extended portions of the claws 13 run over the teeth 27 of the catch ring 16 whereby the latter gives way due to the yielding of the spring 18. The axial vibrations of the relatively great masses of the engaging coupling half and of the shifting elements which otherwise occur during the claw repulsing or overrunning period are effectively prevented and are replaced by the resiliently absorbed movements of a light element whereby the repulsing action does not affect the clutch and shifting elements as a whole.

Figure 2B:
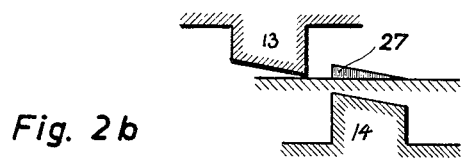

FIG. 2b shows the relative position of the claws 13 and 14 at zero relative rotation of the clutch halves. Thereupon the direction of the relative rotation is reversed and the relative angular velocity increases.

Figure 2C:
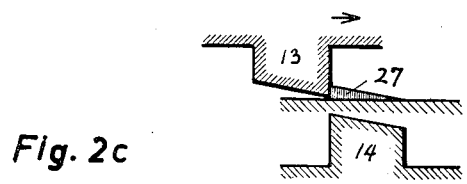
Figure 2D:
Figure 2E:
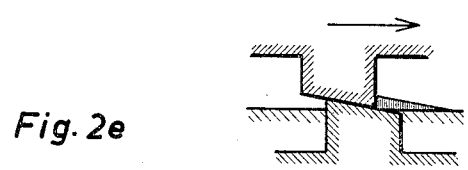
Figure 2F:

FIG. 2c illustrates the moment when the claws 13 engage the teeth 27 and take along the catch ring 16 (FIG. 2d). The protuberance 26 of the catch ring 16 takes along the detent ring 17 whose protuberance 24 glides on the surface 34 until it reaches the trap 35. The rings 15 and 17 can now yield to the clutch engaging pressure acting on the clutch half 11. The extended portion of the claws 13 pushes the blocking ring 15 out of the way and the latter pushes the detent ring 17 into the annular groove 36 in the part 12. The ring 17, acting on the flange 28, takes along the catch ring 16. The axial movement of the blocking ring 15 unlocks the clutch so that the inclined faces of the claws 13 move in a screw line along the inclined faces of the claws 14 (FIG. 2e) until the power transmitting surfaces of the claws 13 and 14 are in aligned position so that the claws 13 can enter the gaps between the claws 14 whereby the clutch is engaged and the relative angular velocity becomes zero (FIG. 2f).

Whereas the path traveled by the claws 13 relatively to the claws 14 from the moment when the direction of the relative rotation is reversed till the moment when the teeth 27 are engaged by the claws 13 may be different, the path traveled by the claws 13 relatively to the claws 14 after engagement of the teeth 27 by the former and until the claws of the two clutch halves meet is always the same.

The structural arrangement of the blocking mechanism according to the invention may be different from that shown without deviating from the scope of the present invention. The catch ring may have at least one tooth or any number of teeth up to a maximum of as many teeth as there are claws in one clutch half. If the number of teeth equals the number of claws in one clutch half, the number of extended claws on the clutch half which is opposite the clutch half including the catch ring may be reduced. There must be at least one extended claw.

Instead of providing extended claws, separate teeth 27' as shown in FIG. 3 may be provided whereby the teeth 27' are set according to the teeth 27 on the catch ring 16.

Instead of providing individual abutments, for example in the form of radially extended claws on the clutch part which is opposite the blocking element, as shown in FIG. 1, these abutments may be combined to form an annular abutment surface 23' as shown in FIG. 3.

In order to reduce the gliding friction between the blocking element and the opposite clutch part, the blocking element may be provided with a roller bearing. This is shown in FIG. 4 wherein the modified blocking element 15' is provided with a roller bearing having rollers 37 and a race ring 38. The roller bearing or an axial ball bearing may form part of the clutch half 11 instead of the clutch half 12.

Figure 5:
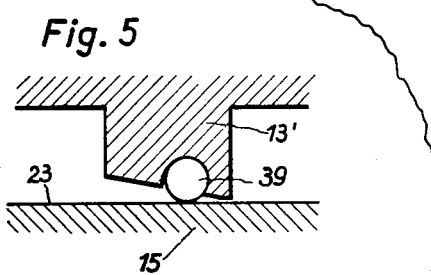
FIG. 5 is a diagrammatic cross sectional view of a modified detail of the clutch according to FIG. 1.

In order to reduce friction between the claws 13 and the blocking element 15 cylindrical rollers 39, as shown in FIG. 5, may be inserted in the claws 13' for rolling on the surface 23 of the blocking element 15.

I claim:

1. In a claw clutch of the overrunning type comprising two coaxial clutch halves, each clutch half having a member provided with axial claws whose end faces are inclined in the same direction relative to the circumference of the respective member, each claw having two radial faces rendering the clutch active in both directions of relative rotation of the clutch halves, at least one of said members being axially movable toward and from the other member for engaging and disengaging the clutch, blocking means axially movably connected to one of said members and adapted to abuttingly engage the second clutch member, actuating means operatively connected to said first member and to said blocking means, and means connected to said first member and to said actuating means for urging said actuating means to move said blocking means into a blocking position for preventing axial movement of said members towards each other when said second member overruns said first member and for permitting movement of said blocking means into unblocking position upon reversal of the relative rotation of said members for allowing said second member to engage said first member and to insert the claws of said second member into the gaps between the claws of said first member.

2. In a claw clutch as defined in claim 1 and wherein said blocking means and said first member include cooperating means permitting axial movement of said blocking means relative to said first member.

3. In a claw clutch as defined in claim 1 and wherein said blocking means has an annular surface and the second clutch member has a surface portion abutted by said annular surface.

4. In a claw clutch as defined in claim 1 and wherein said blocking means and said first member include cooperating means permitting axial movement of said blocking means relative to said first member, and said actuating means includes an annular element coaxial of the clutch and having axial protuberances adapted to be overrun by said second member upon relative overrunning rotation of said members and to be abutted by said second member upon reversal of the direction of the relative rotation of said members for moving said actuating means to afford movement of said blocking means into the unblocking position.

5. In a claw clutch according to claim 4 and wherein said annular element is coaxially movably connected to said first clutch member and adapted to move angularly with respect to the rotation axis of the clutch, said annular element having an end face opposite said second clutch member, said protuberances extending from said end face and being of saw tooth shape, said second clutch member having at least one axially projecting portion overrunning said protuberances upon relative rotation of said clutch members in one direction and individually abutting against said protuberances upon reversal of the direction of the relative rotation of said clutch members, said actuating means including an annular detent means placed coaxial of the rotation axis of the clutch and being axially movably connected to said annular element, means being provided to prevent relative circumferential movement of said detent means and of said element, and resilient means being interposed between said element and said first clutch member for urging said element towards said second clutch member and for urging said element and thereby said detent means to move angularly to a position in which said detent means holds said blocking means in the blocking position until reversal of the direction of the relative rotation of said clutch members causes abutment of said projecting portion of said second clutch member against one of said protuberances and angular movement of said annular element and of said detent means against the action of said resilient means to a position where said detent means unblocks said blocking means.

6. In a claw clutch according to claim 5 and wherein said resilient means is in the form of a helical spring placed coaxially of the clutch and having one end connected to said annular element and the other end connected to said first clutch member.

7. In a claw clutch according to claim 5 and wherein the claws of said second clutch member have portions radially extending beyond the claws of said first clutch member, said blocking means having an annular end face abutting against the portions of the claws of the second clutch member which radially extend beyond the claws of the first clutch member.

8. In a claw clutch according to claim 5 and wherein the claws of said second clutch member have portions radially extending beyond the claws of said first clutch member, the number of said protuberances being at least one and not more than the number of claws of the second clutch member, said protuberances being adapted to be engaged by the portions of the claws of the second clutch member which radially extend beyond the claws of the first clutch member.

9. In a claw clutch as defined in claim 1 and wherein said blocking means has a surface portion and said second clutch member has a surface portion engaging the surface portion of said blocking means, at least one of said surface portions being annular and coaxial of the clutch.

10. In a claw clutch according to claim 9 and wherein one of said surface portions is provided with a roller bearing.

References Cited in the file of this patent
UNITED STATES PATENTS

| 1,960,547 | Paulson | May 29, 1934 |

FOREIGN PATENTS

| 290,667 | Germany | Mar. 11, 1916 |
| 328,726 | Great Britain | May 8, 1930 |
| 416,556 | Great Britain | Sept. 17, 1934 |